Dec. 10, 1968    E. D. KNECHTEL    3,415,116
FLOATING TWO-FORCE-COMPONENT MEASURING DEVICE
Filed Aug. 18, 1966    3 Sheets-Sheet 1

INVENTOR.
EARL D. KNECHTEL
BY
ATTORNEYS

Dec. 10, 1968  E. D. KNECHTEL  3,415,116
FLOATING TWO-FORCE-COMPONENT MEASURING DEVICE
Filed Aug. 18, 1966  3 Sheets-Sheet 2

INVENTOR.
EARL D. KNECHTEL
BY
ATTORNEYS

Dec. 10, 1968  E. D. KNECHTEL  3,415,116

FLOATING TWO-FORCE-COMPONENT MEASURING DEVICE

Filed Aug. 18, 1966  3 Sheets-Sheet 3

INVENTOR.
EARL D. KNECHTEL

BY
ATTORNEYS

United States Patent Office 3,415,116
Patented Dec. 10, 1968

3,415,116
FLOATING TWO-FORCE-COMPONENT MEASURING DEVICE
Earl D. Knechtel, Mountain View, Calif., assignor to the United States of America as represented by the Administrator of the National Aeronautics and Space Administration
Filed Aug. 18, 1966, Ser. No. 573,432
11 Claims. (Cl. 73—141)

ABSTRACT OF THE DISCLOSURE

A two-component force balance utilizing a liquid suspended target. An arm floats on a liquid. A force-receiving target is attached to the arm. Electrode plates are fastened to the arm and the container holding the liquid. The plates and the dielectric therebetween form variable capacitors. A force under test alters the capacitance of the capacitors. Servo circuits coupled to electrodes indicate the force components and move the arm and target to null the displacement caused by the force.

---

The invention described herein was made by an employee of the United States Government and may be manufactured and used by or for the Government for governmental purposes without the payment of any royalties thereon or therefor.

This invention relates to devices for measuring force, and more particularly to a device in which the force-measuring target is supported by flotation on a liquid to provide an extremely versatile force-measuring arrangement.

Conventional force-measuring devices normally support the force-receiving target on a delicate knife edge or by means of a relatively fragile torsion fiber. As a result it has been found somewhat difficult with the prior designs to obtain a force-measuring device which will measure very small forces and yet will be relatively rugged and will also measure a substantial range of force.

Accordingly, one of the objects of the present invention is to provide a force-measuring device which will measure very small forces and yet will be capable of measuring a substantial range of forces; for example, from forces having a magnitude on the order of millidynes to the order of dynes.

Another object of the invention is to provide a device which will be capable of measuring forces of very small magnitude on the order of millidynes and yet will be relatively rugged in construction.

A further object of the invention is to provide a device for measuring forces which is capable of measuring two orthogonal components of a force which strikes the measuring device at an angle.

Another object of the invention is to provide a device for measuring forces which is capable of providing force measurements from which a yawing moment can be calculated.

An additional object of the invention is to provide a force-measuring device of the type described which will be usable in a vacuum environment.

By way of brief description a force-measuring device made in accordance with the invention comprises a container which will receive and hold a liquid. A float member is floated on the liquid and carries with it a target against which the force to be measured will impinge. For example, one use which is contemplated for the force-measuring device is to place it in a very low pressure wind tunnel to simulate the conditions of travel encountered by a satellite. The force which will be measured, then, is the force of the relatively sparse gas molecules striking the target surface. Since the target is, in effect, supported on a liquid it has a very low friction support which provides substantially no resistance to movement of the target in response to even small forces delivered to the target. In addition, the force which resists the movement of the target across the surface of the liquid is obviously the same in all directions. Capacitive type measuring means are provided for detecting and nulling the deflection of the target across the surface of the supporting liquid in a direction normal to the surface of the target and also in a direction parallel to the surface of the target.

The various objects and features of advantage of the invention will become more apparent from the following detailed description wherein reference is made to the accompanying drawings in which.

Figure 1:
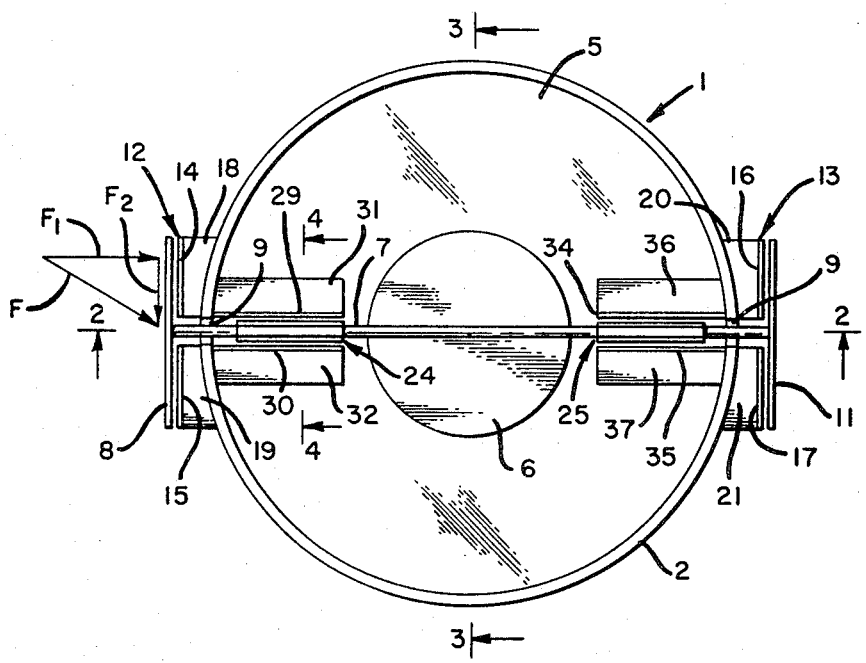
FIGURE 1 is a top plan view of a preferred embodiment of the invention.
Figure 2:
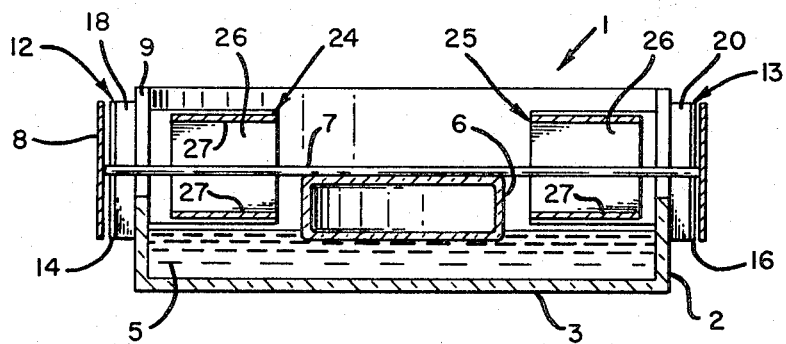
FIGURE 2 is a cross-sectional view taken on the line 2—2 of FIGURE 1.
Figure 3:
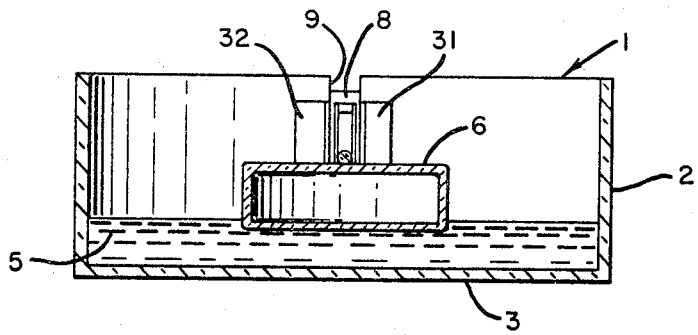
FIGURE 3 is a cross-sectional view taken on the line 3—3 of FIGURE 1.
Figure 4:
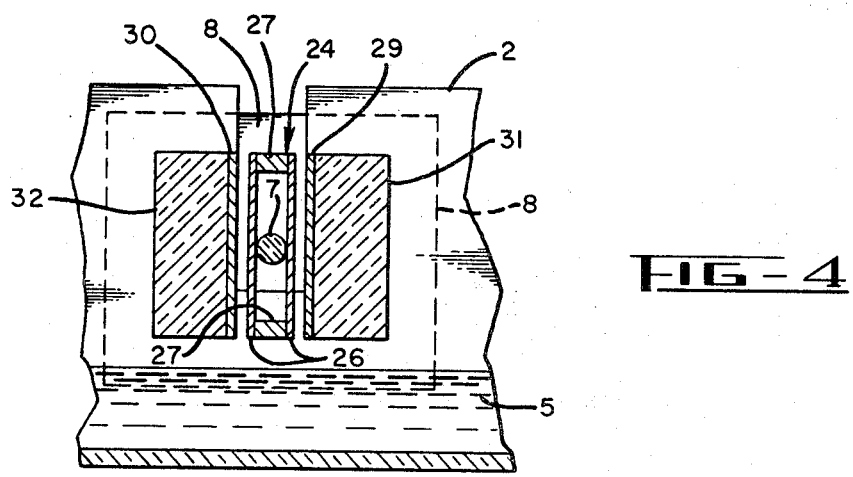
FIGURE 4 is a cross-sectional view on an enlarged scale taken on the line 4—4 of FIGURE 1.

Referring in more detail to FIGURES 1–4 of the drawings, a force-measuring device made in accordance with the invention comprises an open-top dish 1 which forms a container for liquid. The dish is preferably circular in shape, having a cylindrical sidewall 2 and a bottom 3. The dish 1 is preferably made of an inert dielectric material such as quartz or Pyrex capable of resisting chemical attack by liquids such as gallium.

A liquid 5 is placed in the container, and the movable parts of the measuring device are supported on the liquid by means of a float 6. As in the case of the dish 1, the float 6 is preferably made of quartz or Pyrex. The preferred liquid is gallium which remains liquid above 30° C., a temperature range suitable to the high-velocity, rarefied-gas flows for which the device is intended. The reason for selecting liquid gallium is that it has a very low vapor pressure so that it can be used in a vacuum environment without liberating gas molecules which might introduce inaccuracies into the measurements taken by the device and would also, of course, deplete the supply of liquid. Another reason for using liquid gallium is that it has suitable values of viscosity. A balance arm 7 is secured to the top of the float 6 in any suitable manner; for example, by an epoxy glue. The material selected for the balance arm 7 should be a lightweight and rigid material such as quartz.

A target 8 is mounted on one end of the balance arm 7 at right angles thereto. Slots 9 are provided in opposite sides of the cylindrical wall 2 so that the balance arm can pass through the wall as shown in the drawings. The target can be bonded to the quartz rod by any suitable means, such as epoxy glue. The front or outer surface of the target 8 is the force-receiving surface which is struck by the particles such as gas molecules whose impact force is to be measured. The outer, or force-receiving surface of the target 8 may be of any material for which the interaction with impinging gas molecules is to be measured. However, for reference purposes requiring a known gas-surface interaction, it is often preferable to employ a conventional absorbing type surface; for example, the surface can be made of a plurality of very sharp, closely spaced ridges and the surface can be further roughened by being made of anodized aluminum and then coated with a black dye. The inner surface of the target, that is the surface facing toward the float 6, is a metallic material in order to form one plate of a capacitor. Thus, the target 8 can suitably be made of aluminum throughout, or it can be a laminated construction having a metal layer forming the surface which faces the float 6 and a different material forming the layer which serves as the force-receiving surface. The inner surface of the target, that is the surface which forms a capacitor plate, is normal to the axis of the target. In order to counterbalance the target 8 and to cooperate with the capacitor function of target 8 to thereby form a double-acting capacitor arrangement, a second capacitor plate 11 is secured to the other end of the balance arm 7 parallel to the capacitor plate surface of the target. Although the target 8 and capacitor plate 11 are shown as being rectangular in shape, it should be understood that other shapes can be employed, such as circular. The capacitor plate 11 must, of course, be metallic, or at least the side thereof facing toward the float 6.

In order to cooperate with the two movable capacitor plates formed by the target 8 and the plate 11, a pair of stationary metallic capacitor plates 12 and 13 are provided. In order to provide room for passage of the balance arm 7 the capacitor plates 12 and 13 are shown as being made of two sections; for example, the plate 12 is made of sections 14 and 15, and plate 13 is made of sections 16 and 17. Alternatively, the plates 12 and 13 could be of a one-piece construction provided merely with a lot or hole to accommodate the balance arm 7. In order to hold the capacitor plates 12 and 13 in place adjacent to and parallel to their respective movable capacitor plates 8 and 11, respectively, the capacitor sections 14–17 are mounted on supporting brackets 18–21, respectively. The brackets 18–21 can be made of Pyrex or other suitable insulator and secured to the dish 1 and to their respective capacitor sections 14–17 by means of epoxy glue, or alternatively might be supported by screws to provide adjustment of capacitor plate spacing. The two floating capacitor plates 8 and 11, together with their stationary capacitor plates 12 and 13, respectively, serve by means of appropriate electronic circuitry to detect and balance the component $F_1$ of a force F which impinges against the target 8, where the component $F_1$ is normal to target 8, all as will be hereinafter described in more detail.

In order to measure the other orthogonal force component $F_2$, which is tangent to the target 8, an additional set of movable capacitor plates 24 and 25 are mounted on the balance arm 7. As shown in the drawings, the capacitor plates 24 and 25 are preferably composite structures. More specifically, each of the plates 24 and 25 comprises a pair of thin metal sheets 26 bonded to the balance arm 7 by any suitable means, such as epoxy glue. In order to rigidify the structure the upper and lower ends of the sheets 26 are secured to spacing blocks 27, preferably made of metal so that the sheets 26 will both be at the same electrical potential. It should be understood that wherever metal is required as an element of the construction it should be a non-magnetic metal so that magnetic forces will not introduce errors into the measuring apparatus. In order to complete the formation of a double-acting capacitor unit for the movable plate 24, a pair of stationary capacitor plates 29 and 30 are positioned adjacent and parallel to the movable capacitor plate 24 on opposite sides thereof. The plates 29 and 30 can be secured in place by means of mounting blocks 31 and 32, respectively. The mounting blocks can be made of Pyrex and can be secured to the capacitor plates 30 and 31 and to the inside of the cylinder wall 2 by means of epoxy glue or by adjustable screws. It will be understood that the plates 29 and 30 must be metallic and non-magnetic. In like manner, the movable capacitor plate 25 cooperates with a pair of stationary metallic capacitor plates 34 and 35 which are secured in place by means of Pyrex mounting blocks 36 and 37. The movable capacitor plates 24 and 25 and their cooperating stationary capacitor plates are arranged normal to the force-receiving surface of the target and to the movable capacitor plates 8 and 11 so that an exact measurement can be made of the two orthogonal force components $F_1$ and $F_2$. As will be noted from the drawings, all of the movable and stationary capacitor plates are normal to the surface of the liquid 5.

Figure 5:
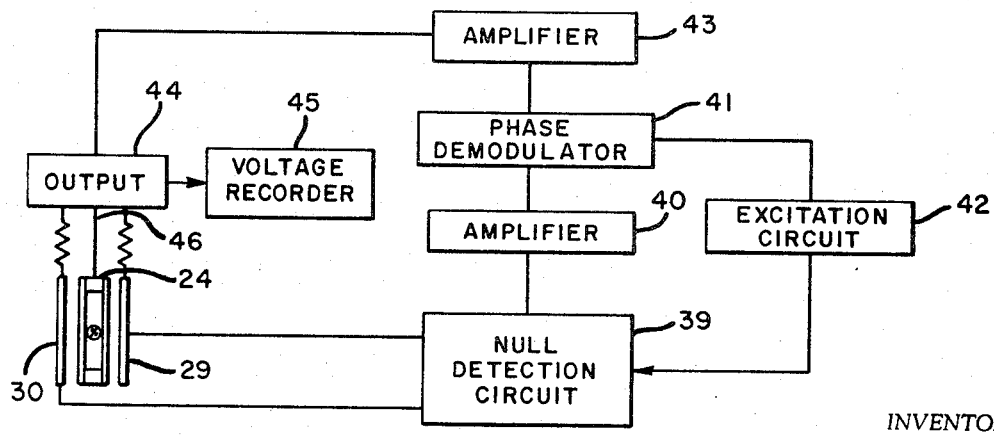
FIGURE 5 is a schematic view showing a representative nulling and recording circuit.

A conventional electrical circuit is connected to each of the double-acting capacitor units in order to detect deflection of the movable capacitor plates and to restore the movable capacitor plates to their center or null positions. By way of example, one such circuit is shown in FIGURE 5 in connection with the movable capacitor plate 24 and the stationary plates 29 and 30. More specifically, the electrical circuit comprises a null detector circuit 39, an amplifier 40, a phase demodulator 41, an excitation circuit 42, an amplifier 43, a driving voltage output 44, and a recorder 45, all of which are of conventional construction. Thus, when the movable capacitor plate 24 moves toward either of its stationary plates 29 and 30, the deflection is detected by the A.C. null-detection circuit 39. The phase demodulator 41 determines the direction of the deflection, and the output 44 provides a voltage to the proper one of the stationary or driving capacitors 29 and 30 to re-null the movable capacitor plate 24. The output 44 also relays to the recorder 45 the balance nulling voltage, which after calibration can of course be transcribed directly as a force.

A circuit similar to that described for the movable capacitor plate 24 is provided for the movable capacitor plate 25, and another such circuit is provided for the capacitor unit formed by the movable plates 8 and 11 and the stationary plates 12 and 13. In the latter case, it will be understood that since the two movable plates 8 and 11 are rigidly interconnected through the balance arm 7 they serve, in effect, as a single movable capacitor plate. Thus, the capacitor plates 8 and 11 can both be connected to the center lead 46 from the output 44 of the associated circuit such as that shown in FIGURE 5. An alternative construction would, of course, be to move the stationary capacitor plate 12 from the position shown in FIGURE 1 to a position on the right of the movable plate 11, also as viewed in FIGURE 1, in which case the target 8 would serve only as a target and not as a capacitor plate. The two portions 14 and 15 of the plate 12 are of course electrically interconnected to be at the same potential, and the portions 16 and 17 of the plate 13 are likewise electrically connected to each other.

In operation, whenever particles in the atmosphere under test, such as gas molecules, strike the target 8, the force of the continuously impinging particles will cause the target to move. The voltage for each of the three double-acting capacitor units which is required to null the effects of the force on each unit will be recorded on the recorder 45 for the respective unit and can be translated through previous calibrations into force measurements. The individual forces which are measured, however, are not in each case the full force shown by the line F in FIGURE 1, but rather the forces which make up the components $F_1$ and $F_2$. The force component $F_1$ will be measured by the circuit which is connected to the capacitor plates 8 and 11 and the stationary plates 12 and 13. The force component $F_2$ will tend to move the capacitor plate 24 as viewed in FIGURE 1 downwardly toward the bottom of the sheet and will also tend to impart a slight counterclockwise rotation about the float 6, as viewed in FIGURE 1. Thus, the force $F_2$ will cause a deflection of both of the movable plates 24 and 25. The direction of the deflection of each of the plates 24 and 25 will be conventionally detected by the A.C. detection circuits and the deflections nulled by the D.C. driving circuits. Then, by prior calibration, using forces of known magnitude and direction, the voltages required to null the capacitor plates 20 and 25 can be translated into the force component $F_2$. Also, because there are two capacitor plates 24 and 25 spaced from each other, it is possible to calculate the yawing moment of the target. In other words the nulling force measured for capacitor plate 24 is multiplied by its lever arm distance to the yawing axis of interest (usually the center of gravity of the target) and added algebraically to the product of the force measured for capacitor plate 25 times its lever arm distance to the yawing axis.

Figure 6:
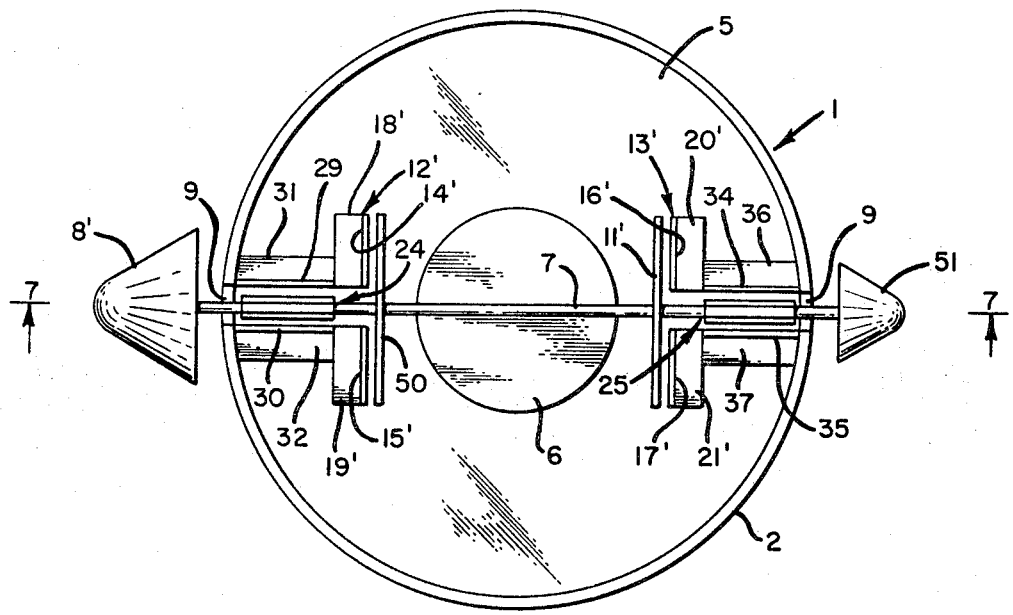
FIGURE 6 is a top plan view similar to FIGURE 1 but showing a modified embodiment.
Figure 7:
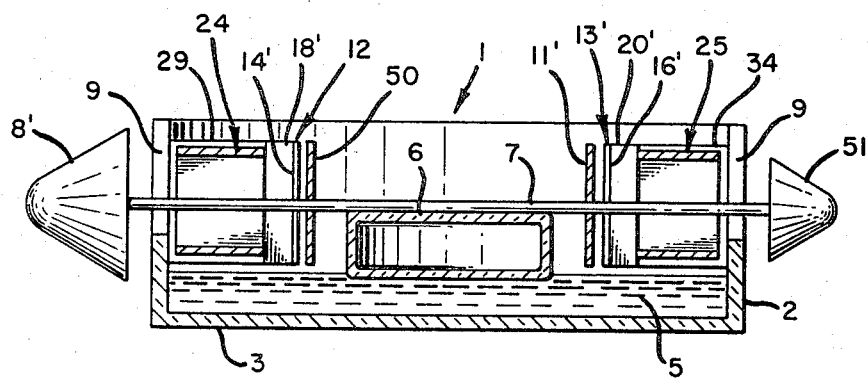
FIGURE 7 is a side view of the embodiment of FIGURE 6.

FIGURES 6 and 7 show a modified embodiment in which all of the capacitor plates are inside the container 1, and the target is in the form of a model. In FIGURES 6 and 7, parts which are identical in function and location to parts in FIGURES 1–4 are given the same reference numbers, and parts which are similar are given primed reference numbers. More specifically, the target 8′ in FIGURES 6 and 7 is in the form of a model and the surface thereof toward the float does not form a capacitor plate. Instead, a separate metallic capacitor plate 50 is bonded, for example with epoxy, to the arm 7 inside the container 1. The plate 50 is arranged normal to the axis of the target or model 8′ and normal to the surface of the liquid 5. The stationary capacitor plate 12 of FIGURE 1 is moved inside the container 1 as at 12′ to cooperate with movable plate 50. As in FIGURE 1, plate 12′ is made of sections 14′ and 15′, parallel to plate 50, and held in place on insulating brackets 18′ and 19′ which are bonded by epoxy to the blocks 31 and 32.

The target or model 8′ can have any desired test shape and one example is the cone shape shown in the drawings. The counterbalance for the target 8′ can be in the form of an alternative target or model 51 of different size, as shown, or of different shape than target 8′, provided the weight of target 51 properly balances the target 8′. Since the balance 51 is not employed as a capacitor plate, the function of capacitor plate 11 of FIGURE 1 is provided by moving the metal plate 11 inside the container 1, as at 11′. Plate 11′ is bonded to the arm 7 as by epoxy in a position parallel to plate 50. The stationary metal capacitor plate 13 of FIGURE 1 is moved inside the container as at 13′ to cooperate with plate 11′. As in FIGURE 1, plate 13′ is made of sections 16′ and 17′ parallel to plate 11′, and held in place on insulating brackets 20′ and 21′ bonded by epoxy to the blocks 36 and 37. It is believed to be obvious that the device of FIGURES 6 and 7 operates the same as the device of FIGURES 1–4, with the capacitor plate 11′ providing the same function as was provided by plate 11, and with capacitor plate 50 providing the same functions as was provided by the capacitor plate formed by the rear or inside face of the target 8 in FIGURE 1.

Although preferred embodiments of the present invention are shown and described herein, it is to be understood that modifications may be made therein without departing from the spirit and scope of the invention as set forth in the appended claims.

What is claimed is:

1. A device for measuring forces comprising wall means forming a container, a liquid in said container, a float supported by said liquid, a force-receiving target connected to said float on one side thereof, means connected to said float on the side thereof opposite said target for balancing the weight of said target, and means for measuring at least one component of a force applied to said target.

2. A device for measuring forces as claimed in claim 1 in which said measuring means comprises means for measuring two orthogonal components of a force applied to said target.

3. A device for measuring forces as claimed in claim 2 in which said liquid is liquid gallium.

4. A force transducer comprising wall means forming a container, a liquid in said container, a float supported on said liquid, a target mounted on said float, said target having a force-receiving surface thereon, capacitive means for producing capacitances which are a function of force components impinging on said target, said capacitance means comprising a first metallic sheet normal to said force-receiving surface and movable therewith to form a first movable capacitor plate, a stationary capacitor plate adjacent said first movable capacitor plate, a second metallic sheet normal to said first metallic sheet and movable with said target to form a second movable capacitor plate, and a stationary capacitor plate adjacent said second movable capacitor plate.

5. A force transducer comprising wall means forming a container, a liquid in said container, a float supported on said liquid, a balance arm mounted on said float and projecting outwardly from opposite sides of said float, a target mounted on one end of said balance arm, said target having a force-receiving surface facing away from said float, capacitive means for producing capacitances which are a function of force components impinging on said target, said capacitance means comprising a metallic sheet on said target facing toward said float and forming a first movable capacitor plate, a stationary capacitor plate positioned adjacent the float-side of said first movable plate, a second movable capacitor plate mounted on the other end of said balance arm and balancing said target, and a stationary capacitor plate positioned adjacent the float side of said movable capacitor plate.

6. A force transducer as claimed in claim 5 further comprising third and fourth capacitor plates mounted on said balance arm on opposite sides of said float, said third and fourth capacitor plates being normal to said first and second plates and normal to the surface of liquid in said container, said first and second plates also being normal to the surface of liquid in said container, and stationary capacitor plates adjacent said third and fourth movable plates.

7. A force transducer as claimed in claim 6 in which said first and second movable plates are outside said container, and said third and forth movable plates are inside said container.

8. A force transducer as claimed in claim 7 in which said liquid is liquid gallium.

9. A force transducer comprising wall means forming a container, a liquid in said container, a float supported on said liquid, a force-receiving target mounted on said float, capacitive means for producing capacitances which are a function of force components impinging on said target, said capacitive means comprising a first movable capacitor plate means connected to said float, a first stationary capacitor plate means cooperating with said first movable plate means, a second movable capacitor plate means connected to said float and at an angle to said first movable plate means, and a second stationary capacitor plate means cooperating with said second movable plate means.

10. A force transducer as claimed in claim 9 in which said target is positioned outside said container, and said first movable plate means comprises a metallic sheet on the side of said target opposite impinging forces.

11. A force transducer as claimed in claim 9 in which all of said stationary and movable plate means are positioned inside said container.

References Cited

UNITED STATES PATENTS

| | | | |
|---|---|---|---|
| 2,397,038 | 3/1946 | Obenshain et al. | 73—437 |
| 3,216,517 | 11/1965 | John | 177—207 |
| 3,221,563 | 12/1965 | Wing | 73—516 |
| 3,224,263 | 12/1965 | Rogallo | 73—142 |

RICHARD C. QUEISSER, *Primary Examiner.*

CHARLES A. RUEHL, *Assistant Examiner.*

U.S. Cl. X.R.

73—170; 317—246